Patented Nov. 17, 1925.

1,562,309

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

METHOD OF CONCENTRATING AND DRYING FRUIT JUICES.

No Drawing.   Application filed August 2, 1922.   Serial No. 579,299.

*To all whom it may concern:*

Be it known that I, WALTER H. DICKERSON, a citizen of the United States, and a resident of East Orange, in the county of Essex and State of New Jersey, have invented certain new and useful Improvements in Methods of Concentrating and Drying Fruit Juices, of which the following is a specification.

The invention relates to a method for obtaining fruit juices in concentrated form, either liquid or solid, and especially such juices as contain aromatic ethers or other volatile compounds.

It has for its object to effect this concentration in such a manner that there shall be no appreciable loss of the aromatic ethers or aromatic compounds which give the juices their characteristic flavor and bouquet; and also, to effect such concentration without caramelization of any sugar content thereof. When the concentrated product is thereafter rediluted to the strength of the original fruit juice, its initial flavor will not have been materially changed and the peculiar characteristics of the product in the fresh state are retained.

Various attempts have heretofore been made to accomplish this result, as by concentration thru the application of heat; but, in many instances, a flavor results which is entirely unnatural to the fresh product and is due in part, probably, to the action of the heat on the various sugars present. Furthermore, concentration under conditions involving elevated temperatures and high vacua causes rapid dissipation of such substances as the aromatic ethers and similar volatile compounds.

I am aware, that a concentration preliminary to spray-drying has been proposed in the case of milk in the production of a dry powder, but a substance of this character is of an entirely different class from fruit juices in that to no great extent are the aromatic ethers or other volatile compounds present, and, furthermore, the preliminary concentration is alleged to be for the purpose merely of securing a final product of heavy bulking characteristic.

In carrying out the present invention, where spray-drying is employed, the preliminary concentration is conducted in manner to obviate any loss of aromatic ethers or other volatile compounds and without danger of caramelization, the concentrate being in best condition for the production of powder therefrom and precluding any deleterious effect thereon the drying gas, which is generally at a comparatively high temperature.

To attain this desirable end, the fruit juice, which may contain some 10% solids, is first appreciably concentrated, as to form 30 to 50 percent solids; and it may then be dried to a powder form by spraying or atomizing the concentrated juice into air or gas at a temperature initially above the critical temperature of the fruit juice, to wit— the point at which caramelization of the contained sugars occurs. However, the particles thus dried will not be subjected during the drying to such temperatures, or to any temperature above their critical temperatures, for a period sufficiently long to injuriously affect same or to materially alter their composition or flavor. It will be appreciated in this connection that the evaporation period is only a fraction of a second in duration; and that because of the great rapidity of this evaporation, a refrigeration effect occurs, serving to lower the temperature of the material beyond the danger point. This makes it possible to employ, in the spray-drying operation, a drying gas or medium at high initial temperatures, for example, suitable temperatures may range in many cases from 400° F. to 600° F., and which are appreciably above the critical temperature of the juice treated. Furthermore, the physical characteristics of the final dried product or particle, for example as to coarseness or form, will depend upon the size of the orifice of the spray nozzle employed and the pressure with which the juice is expelled therefrom into the drying gas, as well as the initial temperatures of the liquid and gas.

I have found, also, in carrying out the concentration of fruit juice to a dried powdered condition, that the retention of the natural flavor thereof is very materially assisted by retaining in such juices the pulp which forms the cells in which the juices are found in the natural fruits, and that the clarifying of same is more or less disadvantageous; although I do not desire to be restricted to the use of fruit juices in which the pulp is retained. Also, a preservative such as cane sugar may be added to the fruit juice; and, as in the case of retention of the pulp, the function of an added material or materials of this character is to serve as a carrying vehicle for the aromatic ethers and to mask the lower melting point and hygroscopic characteristic.

As already stated, to effect said results it is necessary first to concentrate the fruit juices to a more or less high degree before attempting to spray-dry same to a dry powdered state, as the amount of water to be evaporated therefrom is relatively large as compared to the amount of solids present. In the spray-drying there would thus be a tendency, otherwise, to a maximum dissipation of the volatile compounds; whereas, in the concentrated condition, there is a minimum of evaporation required and consequently a minimum loss of the highly important aromatic ethers and other volatile substances of the fruit juice.

The preliminary concentration of the fruit juice can be most satisfactorily carried out by freezing the water from the juice; and this operation is best conducted in such manner that the formation of the congealed water in large masses is obviated. As a result of same, there is no appreciable occlusion of the substance which it is desired to recover in concentrated form. This desirable result is effected by preventing agglomeration of the crystals during the freezing action, as by suitably agitating or stirring the liquid during this period, whereupon the separation of the remaining liquid therefrom is effected in any well-known or special manner, as for example by centrifuging a mixture of the liquid and small crystals. This treatment dispenses with the use of heat in connection with the highly diluted original juice and thus obviates loss of its aromatic ethers and other volatile compounds. The fruit juice may thereby be concentrated to the desired degree as from 30 to 50 per cent, or more, of its solids, whereupon it may be further concentrated, as to dry powder form, by spray-drying same, as hereinbefore set forth.

I claim:—

1. The method of treating fruit juices, which consists in concentrating same by freezing to thereby preserve the aromatic ethers thereof, and then drying to a powder by spraying the concentrate into a hot gas.

2. The method of treating fruit juices, which consists in concentrating the fruit juice by freezing the same and retaining its pulp therein, and spraying the concentrate with pulp into a hot gas.

3. The method of treating fruit juices, which consists in incorporating a carrying vehicle for the aromatic ethers of the fruit juices, concentrating the fruit juice by freezing the same, and then spray-drying same.

4. The method of treating fruit juices, which consists in extracting water therefrom by freezing same while stirring to form crystals to prevent thereby agglomeration and to avoid occlusion of the concentrate, separating said concentrate from the crystals, and spraying same into a hot gas.

5. The method of treating fruit juices, which consists in concentrating same to from 30% to 50% solids by freezing the water thereof while stirring to form crystals to prevent agglomeration and to avoid thereby occlusion of the concentrate, separating said concentrate from the crystals, and spraying same into a gas at a temperature not exceeding 600° F.

Signed at New York in the county of New York and State of New York this 31st day of July A. D. 1922.

WALTER H. DICKERSON.